United States Patent
Ewanchuk et al.

(10) Patent No.: US 11,204,984 B2
(45) Date of Patent: Dec. 21, 2021

(54) SYSTEMS AND METHODS FOR MANAGING ACCESS TO APPLICATION DATA ON COMPUTING DEVICES

(71) Applicant: BlackBerry Limited, Waterloo (CA)

(72) Inventors: Andrew John Ewanchuk, Baden (CA); Chad Robert Ford Furniss, Kitchener (CA); Liam Ronald Quinn, Kitchener (CA)

(73) Assignee: BlackBerry Limited, Waterloo (CA)

( * ) Notice: Subject to any disclaimer, the term of this patent is extended or adjusted under 35 U.S.C. 154(b) by 226 days.

(21) Appl. No.: 16/439,138

(22) Filed: Jun. 12, 2019

(65) Prior Publication Data

US 2020/0394286 A1    Dec. 17, 2020

(51) Int. Cl.
*G06F 21/12* (2013.01)
*G06F 21/31* (2013.01)
*G06F 21/60* (2013.01)
*G06F 21/62* (2013.01)

(52) U.S. Cl.
CPC ............ *G06F 21/126* (2013.01); *G06F 21/31* (2013.01); *G06F 21/60* (2013.01); *G06F 21/6227* (2013.01); *G06F 21/6245* (2013.01)

(58) Field of Classification Search
CPC ........ G06F 21/126; G06F 21/31; G06F 21/60; G06F 21/6227; G06F 21/6245; G06F 21/12; G06F 21/62
See application file for complete search history.

(56) References Cited

U.S. PATENT DOCUMENTS

| 9,164,654 | B2 * | 10/2015 | Goertz | G06F 3/0488 |
| 9,195,388 | B2 * | 11/2015 | Shepherd | G06F 21/6218 |
| 2012/0079586 | A1 * | 3/2012 | Brown | G06F 3/0482 726/16 |
| 2012/0323717 | A1 * | 12/2012 | Kirsch | G06F 21/31 705/26.1 |
| 2013/0082945 | A1 | 4/2013 | Jo | |
| 2013/0283387 | A1 | 10/2013 | Wang | |

(Continued)

OTHER PUBLICATIONS

EPO: Extended European Search Report relating to EP application No. 20159478.5, dated Oct. 5, 2020.

(Continued)

*Primary Examiner* — Jayesh M Jhaveri
(74) *Attorney, Agent, or Firm* — Rowand LLP (57) ABSTRACT

A method implemented by a computing device is disclosed. The method includes: detecting a change in state of an application that is managed using an applications manager, the change in state being based on a first action within the applications manager; in response to detecting the change in state of the application: identifying at least one list of a plurality of application event listings stored on the computing device independently of the applications manager; determining that the at least one list includes one or more first application event listings associated with the application; and in response to determining that the at least one list includes the one or more first application event listings: determining a second action to apply to only the one or more first application event listings; and applying the second action to the one or more first application event listings.

16 Claims, 6 Drawing Sheets

(56) References Cited

U.S. PATENT DOCUMENTS

| | | | |
|---|---|---|---|
| 2014/0038561 A1* | 2/2014 | Wang | H04W 12/086 |
| | | | 455/411 |
| 2014/0101768 A1* | 4/2014 | Miller | G06F 21/629 |
| | | | 726/25 |
| 2014/0283012 A1* | 9/2014 | Eggerton | G06F 21/31 |
| | | | 726/19 |
| 2015/0079943 A1* | 3/2015 | Williams | H04W 12/08 |
| | | | 455/411 |
| 2016/0055342 A1* | 2/2016 | Bivona | G06F 21/62 |
| | | | 726/26 |
| 2017/0063750 A1* | 3/2017 | Vardhan | H04L 51/24 |
| 2017/0228504 A1* | 8/2017 | Whitkin | G06F 21/604 |
| 2018/0232534 A1* | 8/2018 | Dotan-Cohen | H04W 12/033 |
| 2018/0336325 A1* | 11/2018 | Chinn | G06F 21/84 |
| 2014/0040756 A1 | 2/2019 | Bukurak et al. | |

OTHER PUBLICATIONS

Buckell: "How to Hide Sensitive Notifications from the Android Lock Screen", XP055733940, dated Nov. 23, 2017.

\* cited by examiner

SYSTEMS AND METHODS FOR MANAGING ACCESS TO APPLICATION DATA ON COMPUTING DEVICES

TECHNICAL FIELD

The present disclosure relates to data security and, in particular, to methods for managing access to application data on computing devices. The present disclosure also relates to user interfaces and, in particular, to methods for controlling display of application events information on computing devices.

BACKGROUND

Modern computing devices support various types of applications. In addition to applications that are pre-installed on their devices, users may download third-party software to enable a wide range of functionalities. Each third-party software has its own policy for handling different aspects of application behavior such as, for example, mobile data usage, payment processing, network connection settings, and cache data management.

Users may store sensitive data on their computing devices that they wish to keep private to themselves or accessible to a limited number of authorized parties. Safekeeping of data on a computing device can often be challenging. In particular, divergent policies of third-party software installed on a computing device may pose difficulties for secure management of private user data.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a method of managing access to application data on a computing device. The method includes: detecting a change in state of an application that is managed using an applications manager, the change in state being based on a first action within the applications manager; in response to detecting the change in state of the application: identifying at least one list of a plurality of application event listings stored on the computing device independently of the applications manager, the plurality of application event listings corresponding to a plurality of application events; determining that the at least one list includes one or more first application event listings associated with the application; and in response to determining that the at least one list includes the one or more first application event listings: determining a second action to apply to only the one or more first application event listings; and applying the second action to the one or more first application event listings.

In some implementations, the change in state may comprise a switch of the application from an unlocked state to a locked state.

In some implementations, the method may further include displaying, on a display, a graphical representation of the at least one list, the graphical representation including user interface elements corresponding to the plurality of application event listings of the at least one list, wherein the second action comprises removing, from the graphical representation, user interface elements corresponding to the one or more first application event listings.

In some implementations, the second action may comprise deleting the one or more first application event listings from the at least one list.

In some implementations, the second action may comprise locking the one or more first application event listings, wherein the locking comprises requiring user authentication for accessing content of the one or more first application event listings.

In some implementations, the method may further include receiving selection of one of the first application event listings from the at least one list and input of user authentication data; verifying that a user associated with the inputted user authentication data is permitted to access application data associated with the application; and in response to verifying that the user associated with the inputted user authentication data is permitted to access the application data, granting, to the user, access to the selected first application event listing.

In some implementations, the change in state may comprise a switch of the application from a locked state to an unlocked state.

In some implementations, the second action may comprise unlocking the one or more first application event listings, and wherein the unlocking comprises removing restrictions on accessing content of the one or more first application event listings.

In some implementations, the method may further comprise displaying, on a display, a graphical representation of the at least one list, the graphical representation including user interface elements corresponding to the plurality of application event listings of the at least one list, wherein the second action comprises changing visibility of user interface elements corresponding to the one or more first application event listings.

In some implementations, detecting the change in state of the application may comprise receiving, from the applications manager, an indication of the change in state.

In another aspect, the present disclosure describes a computing device. The computing device includes an input interface, a memory, and a processor coupled to the input interface and the memory. The processor is configured to: detect a change in state of an application that is managed using an applications manager, the change in state being based on a first action within the applications manager; in response to detecting the change in state of the application: identify at least one list of a plurality of application event listings stored on the computing device independently of the applications manager, the plurality of application event listings corresponding to a plurality of application events; determine that the at least one list includes one or more first application event listings associated with the application; and in response to determining that the at least one list includes the one or more first application event listings: determine a second action to apply to only the one or more first application event listings; and apply the second action to the one or more first application event listings.

Other example embodiments of the present disclosure will be apparent to those of ordinary skill in the art from a review of the following detailed descriptions in conjunction with the drawings.

In the present application, the term "file vault" is intended to broadly encompass software, such as an application or utility, which may be used to store and/or manage one or more data files on a computing device. A file vault may be configured to regulate access to "protected" files on a computing device. A data file (e.g. media file, such as photo, video, musical recording, etc.) may be referred to as a protected file if it is intended to be kept private, i.e. accessible to only a limited number of authorized parties. A file may be designated as protected by, for example, setting metadata for the file to indicate a "protected" status, saving the file in a file vault, or adding file information for the file in a protected files database.

A file vault may be used to enforce security policies relating to user access of protected files on a computing device. For example, users may be able to access content of protected files that are stored in a file vault only upon successful authentication to the file vault. In particular, the file vault may prohibit unauthorized access of content of protected files. Authorized users can gain access to protected files by providing their authentication credentials to the file vault directly or to a separate application which manages requests to access the file vault.

A file vault implementation on a computing device may represent a data storage, or repository, for one or more protected files. Users may create or obtain files and save them in a file vault, thereby restricting access to the files. Alternatively or additionally, a file vault may be an application for performing various operations, such as opening, editing, saving, etc., with respect to the content of protected files. For example, a file vault may be set as the default application for opening files that are stored in the file vault. More generally, a file vault may be configured to manage access permissions for any protected file, regardless of where the file is stored in memory. That is, files that are designated as "protected" and not saved in a file vault may also be managed using the file vault.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A computing device may store data files that are intended to be kept private or "protected", i.e. accessible only by authorized users. These protected files may be of different types or formats, and various different applications on the computing device may be suitable for opening such files. In particular, third-party applications—software that is provided by third-party developers—may be used to access the content of protected files. As a consequence, users of the computing device may not have complete control over some of the behavior and policies of the applications that are used to interact with protected files.

For example, the behavior of certain applications in handling cached data may be beyond users' control. Some applications may cache file data as part of the application's data. When a third-party application is used to open a file, the application may temporarily store the file and/or file information as cached data. For certain third-party applications, owners of protected files may not be able to limit access to the cached file data by other users during subsequent uses of the applications. This lack of control over access to cached file data can be a security risk, and may result in users unwittingly exposing content of protected files when using third-party applications.

In an aspect, the present disclosure provides methods for managing access to protected file content on a computing device. Specifically, a file vault for securely storing and/or managing access permissions for protected files is disclosed. The file vault may, for example, be an application or system utility for regulating user access to applications that are used to open one or more protected files. Upon receiving a user request to access a protected file, the file vault may select a suitable application for opening the file and determine whether the selected application is secure. If the selected application is an unsecured application, the file vault may lock the selected application to prevent unauthorized subsequent access of the application. In this way, the file vault may ensure that application data, including cached file data, for applications that are used to access one or more protected files on the computing device is not made available to users that do not have access permissions for the protected files.

The disclosed file vault may also be used to manage applications on a computing device. In particular, the file vault may be used to control various properties or settings associated with one or more managed applications. By way of example, an application that is used to open a protected file may be set to a locked state using the file vault. An authorized user of the file vault may, for example, manually set the application to the locked state. Alternatively, if the application is an unsecured application, it may be set to the locked state automatically when the computing device detects that the application was used to open a protected file. The file vault can be used to ensure that access to one or more managed applications are limited to those users that have express authorization to access the applications and/or their associated application data.

In an aspect, the present disclosure provides methods for preventing unauthorized access of application data on a computing device. Specifically, methods for managing user access to application events information are disclosed. Application events are events (e.g. actions, activities, communications, etc.) that are generated or performed by, or otherwise associated with, applications on a computing device. Application events include, among others, various types of messages and notifications. In at least some embodiments, a unified event manager may collect information about application events on the computing device. For example, a unified inbox application may be configured to collect information about application events of different types and/or user accounts, and present the information in a content list for viewing or interaction by users of the computing device. A unified inbox may, for example, comprise a list of a plurality of application event listings, where each application event listing corresponds to a specific application event.

In accordance with disclosed embodiments, a unified inbox on a computing device may be updated dynamically based on detected changes in state (or property, setting, etc.) of a managed application on the computing device. The computing device detects a change in state of the managed application based on, at least, a first action within an applications manager which manages the application. In response to detecting the change in state of the managed application, the computing device determines whether the unified inbox, which is stored on the computing device independently of the applications manager, includes one or more application event listings that are associated with the managed application. If the unified inbox does include such application event listings, the computing device applies a suitable second action to the application event listings. The second action may be applied globally to affect all application event listings that are associated with the managed application. As a specific example, the managed application may be set to a locked state, and upon detecting that the managed application has been set to the locked state, the computing device may hide, remove, disable, or otherwise restrict access to application event listings that are associated with the managed application.

Figure 1:
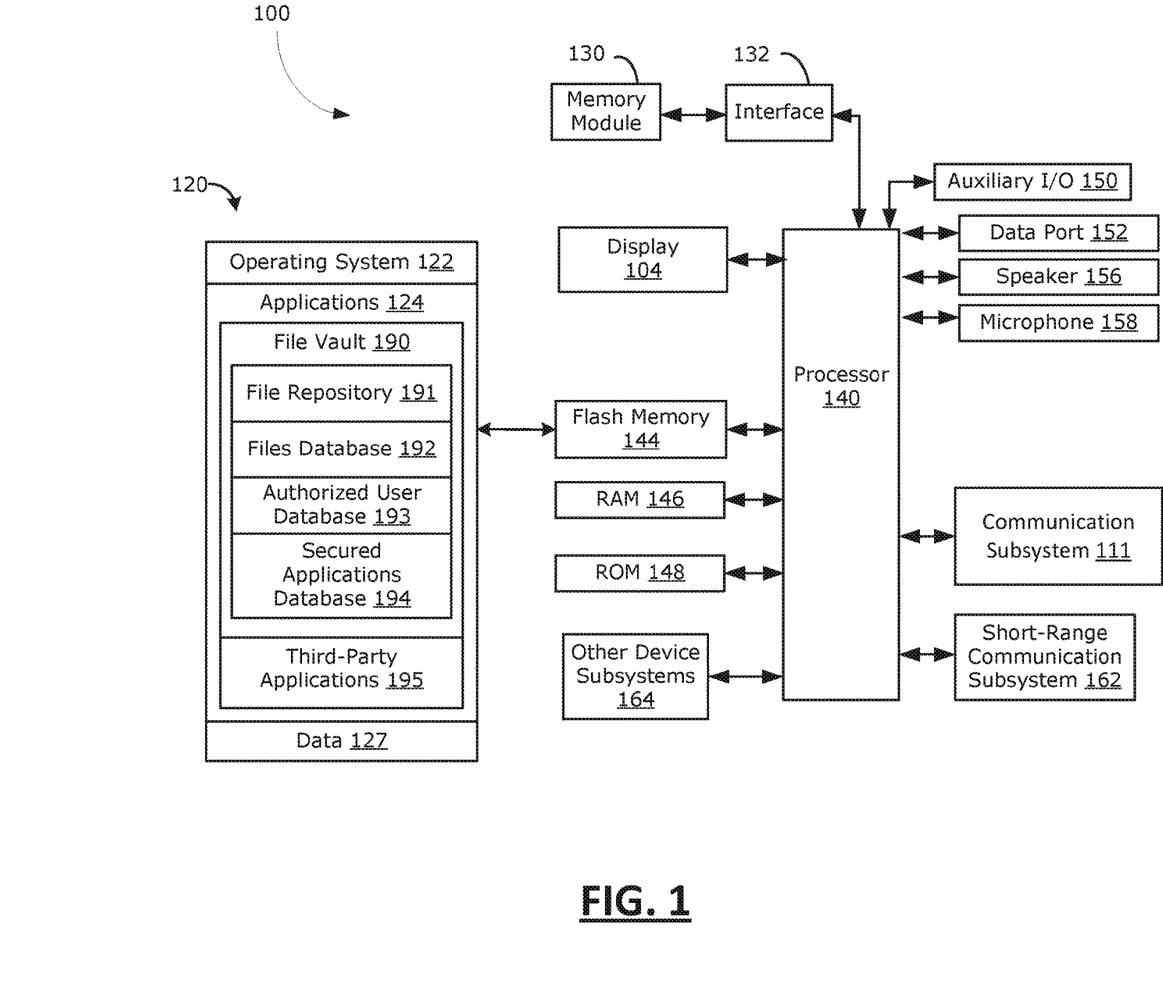
FIG. 1 is a block diagram illustrating components of an example computing device.

Reference is first made to FIG. 1, which illustrates a block diagram of an example computing device 100. In an example embodiment, the computing device 100 may be a mobile communication device. The mobile communication device may be configured for two-way communication, having data and optionally voice communication capabilities, and the capability to communicate with other computer systems, e.g. via the internet. In other embodiments, the computing device 100 may take other forms, such as smartwatches, desktop computers, tablets, laptops, or any other electronic device configured for connection over wireless networks.

The computing device 100 of FIG. 1 includes a housing (not shown) which houses components of the computing device 100. Internal components of the computing device 100 may be constructed on a printed circuit board (PCB). The computing device 100 includes a controller including at least one processor 140 (such as a microprocessor) which controls the overall operation of the computing device 100. The processor 140 interacts with device subsystems, such as a wireless communication subsystem 111, for exchanging radio frequency signals with a wireless network to perform communication functions. The processor 140 interacts with additional device subsystems including one or more input interfaces (which may include, without limitation any of the following: a keyboard, one or more control buttons, one or more microphones 158, a gesture sensor, and/or a touch-sensitive overlay associated with a touchscreen display), flash memory 144, random access memory (RAM) 146, read only memory (ROM) 148, auxiliary input/output (I/O) subsystems 150, a data port 152 (which may be a serial data port, such as a Universal Serial Bus (USB) data port), one or more output interfaces (such as a display 104), one or more speakers 156, or other output interfaces), a short-range communication subsystem 162, and other device subsystems generally designated as 164.

In some example embodiments, the auxiliary input/output (I/O) subsystems 150 may include an external communication link or interface, for example, an Ethernet connection. The communication subsystem 111 may include other wireless communication interfaces for communicating with other types of wireless networks, e.g. Wi-Fi networks.

In some example embodiments, the computing device 100 also includes a removable memory module 130 (typically including flash memory) and a memory module interface 132. Network access may be associated with a subscriber or user of the computing device 100 via the memory module 130, which may be a Subscriber Identity Module (SIM) card for use in a GSM network or other type of memory module for use in the relevant wireless network type. The memory module 130 may be inserted in or connected to the memory module interface 132 of the computing device 100.

The computing device 100 may store data 127 in an erasable persistent memory, which in one example embodiment is the flash memory 144. In various example embodiments, the data 127 may include service data having information required by the computing device 100 to establish and maintain communication with the wireless network. The data 127 may also include user application data such as messages (e.g. emails, text messages, multimedia messages, etc.), address book and contact information, calendar and schedule information, notepad documents, image files, and other commonly stored user information stored on the computing device 100 by its users, and other data.

The data 127 stored in the persistent memory (e.g. flash memory 144) of the computing device 100 may be organized, at least partially, into a number of databases or data stores each containing data items of the same data type or associated with the same application. For example, email messages, contact records, and task items may be stored in individual databases within memory of the computing device 100.

The short-range communication subsystem 162 provides for communication between the computing device 100 and different systems or devices, which need not necessarily be similar devices. For example, the short-range communication subsystem 162 may include an infrared device and associated circuits and components, a wireless bus protocol compliant communication mechanism such as a Bluetooth® communication module to provide for communication with similarly-enabled systems and devices, and/or a near-field communication (NFC) interface.

A set of applications that control basic device operations, including data and possibly voice communication applications may be installed on the computing device 100 during or after manufacture. Additional applications and/or upgrades to an operating system 122 or software applications 124 may also be loaded onto the computing device 100 through the wireless network, the auxiliary I/O subsystem 150, the data port 152, the short-range communication subsystem 162, or other suitable device subsystems 164. The downloaded programs or code modules may be permanently installed; for example, written into the program memory (e.g. the flash memory 144), or written into and executed from the RAM 146 for execution by the processor 140 at runtime.

The processor 140 operates under stored program control and executes software modules 120 stored in memory such as persistent memory, e.g. in the flash memory 144. As illustrated in FIG. 1, the software modules 120 may include operating system software 122 and one or more applications 124 (or modules). Specific examples of applications that may be resident on the computing device 100 include an email messaging application, as well as other types of messaging applications for instant messaging (IM), short message service (SMS), and social networking or messaging applications. Other applications for messaging may be included, and multiple applications for each type of message format may be loaded onto the computing device 100. Alternatively, other means may be implemented on the computing device 100 to provide access to multiple messaging accounts and/or message types. For example, a unified inbox application may be provided on the computing device 100 as an application or as part of the operating system. The unified inbox may be configured to list messages received at and/or sent from the computing device 100, regardless of message format or messaging account. The unified inbox will be described in greater detail below, with reference to FIG. 2.

The computing device 100 also includes a file vault 190. In the example embodiment of FIG. 1, the file vault 190 is illustrated as being implemented as a stand-alone application, but in other example embodiments, a file vault may be implemented as part of system security utilities or services of the operating system 122. For example, the features of a file vault may be integrated into an applications manager for the operating system 122.

The file vault 190 may store one or more protected files. In particular, the file vault 190 may implement a file repository 191 for storing protected files. In at least some embodiments, the file vault 190 may provide a functionality for adding existing files to the file repository 191. For example, a graphical user interface (GUI) for the file vault 190 may include user interface elements associated with options, such as file upload, drag-and-drop, etc., for moving existing files that are stored elsewhere in memory of the computing device 100 to the file repository 191. The file vault 190 may additionally allow new files to be created from within the file vault 190. For example, the file vault 190 may include a functionality for creating new files (e.g. text document). Any new files that are created using the file vault 190 may be classified as "protected" and saved to the file repository 191.

The file vault 190 may additionally store data associated with one or more protected files on the computing device 100. In particular, the file vault 190 may implement a files database 192 that is configured to store data corresponding to one or more protected files. The files database 192 may contain file information for one or more existing files. An existing file may be added to the files database 192 by entering its file information into the database. For example, a user can manually enter information for a file using the file vault 190 to cause the file to be added to the files database 192.

More generally, the file vault 190 may be configured such that files having a certain property are automatically added to the files database 192. For example, file information for files on the computing device 100 that are identified as "protected" may be automatically added to the files database 192. Thus, a user may cause a file to be added to the files database 192 by setting or editing the properties of a file to indicate the file's status as a protected file. A user may, for example, modify the file metadata for a file to indicate a protected file status. The files that are added to the files database 192 are associated with the file vault 190. For example, the file vault 190 may be set as the default application for opening the files in the files database 192.

In at least some embodiments, file records containing information associated with protected files may be created and saved in the files database 192. For example, file records may be created in the files database 192 for one or more protected files that are stored in the file repository 191 or elsewhere in memory of the computing device 100. A file record may specify file information such as, for example, a file identifier (e.g. file name), file type, location of the file in memory, identity of creator of the file, date of file creation, and date of last file access. In some embodiments, file records may be accessed via a GUI for the file vault 190. For example, the GUI for the file vault 190 may display a listing of files and file records that are stored in the files database 192. Selecting an entry corresponding to a file may open the file or, in the case of a file record, display data that is contained in the file record.

Access to the file vault 190 and the data associated therewith may be controlled by a password. In particular, a master password may be required to gain access to the file vault 190, the files in the file repository 191, and the records of the files database 192. For example, the file vault 190 may present users with a prompt to enter a master password each time a request to access the file vault 190 is made. The features of the file vault 190 may become accessible upon correctly inputting the master password. A "master password" is intended to broadly encompass any type of authenticator that may be used for authentication and/or to gain access to the file vault 190. For example, a master password may be text-based, non-text-based, or a combination of both.

In some embodiments, the files database 192 may be stored locally in memory (e.g. flash memory 144) of the computing device 100. In particular, the file vault 190 may directly access the records of the files database 192 on the computing device 100. Alternatively, the files database 192 may be stored at and maintained by a remote service. For example, a remote server associated with the file vault 190 may be configured to maintain a plurality of file records. The file vault 190 can establish connections to the remote server in order to retrieve, add, delete, and/or update the file records stored remotely in the files database 192.

The file vault 190 enforces file security policies associated with protected files that are stored in file repository 191 and/or listed in the files database 192. Specifically, the file vault 190 grants access to the protected files of the file repository 191 and files database 192 only to the users that have access permissions for those files. The file vault 190 prohibits access by any other users of the computing device. In at least some embodiments, the file vault 190 may maintain a database of users that are authorized to access the protected files. An authorized user database 193 may indicate, for one or more of the protected files, users that have authorization to access the files. The authorized user database 193 may, in some embodiments, also indicate a level of authorization for each of the authorized users. For example, the authorized user database 193 may specify the files that a user is authorized to access and the file permissions granted to the user for each of those files. The authorized user database 193 may be updated, either manually or periodically, to add or delete users or to modify authorization levels for previously authorized users.

In at least some embodiments, the file vault 190 may be configured to directly handle opening the protected files of the file repository 191 and files database 192. That is, users may be able to open and access the content of the protected files from within the file vault 190. However, this option to open a file using the file vault 190 may not always be available. For example, some files may be of data types that are not supported by the built-in content navigators (e.g. viewer, editor, etc.) of the file vault 190.

In such cases, users may be presented with options to launch third-party applications 195 on the computing device 100 to access the files. As will be explained in greater detail below, each third-party application 195 may be categorized as secured or unsecured, based on whether its behavior has been modified in accordance with the application security mechanism described in the present disclosure. A secured applications database 194 may be maintained by the file vault 190 for tracking the applications that are deemed, by the file vault 190, to be secure. Specifically, the secured applications database 194 may list the applications that adhere to the application security settings enforced by the file vault 190. In at least some embodiments, the file vault 190 may limit the applications which can be used for accessing the protected files to only those applications that are listed in the secured applications database 194. Authorized users can select a suitable one of the secured applications to access the content of protected files. For example, when attempting to open a file within the file vault 190, users may be presented with options to launch one or more of the secured applications that support the file type of the file. Unsecured applications may be prohibited from opening any protected file in the file repository 191 or files database 192. For example, protected files may not be accessible or visible from within an unsecured application.

Figure 2:
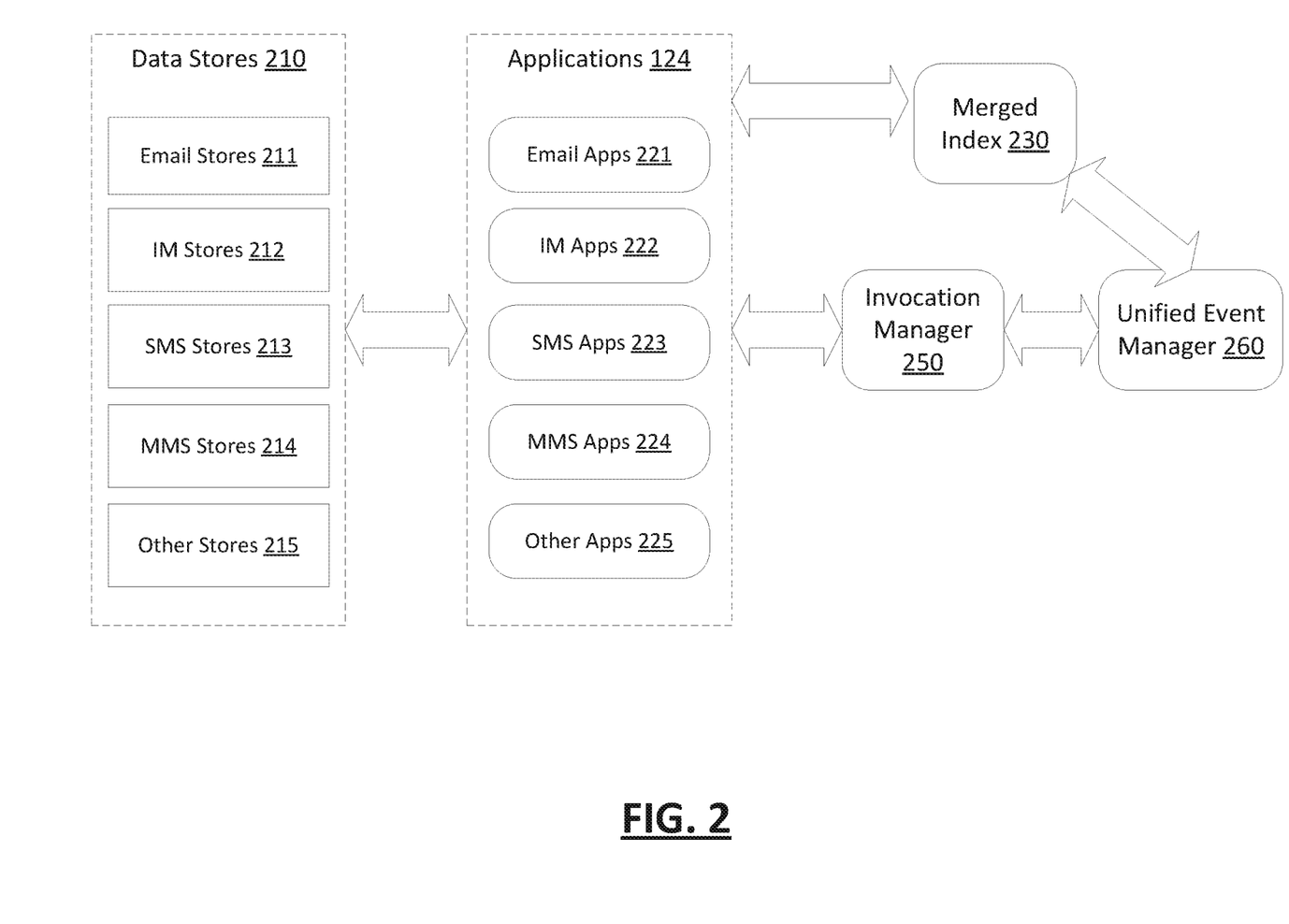
FIG. 2 shows example components of the computing device of FIG. 1 and interaction between the components.

FIG. 2 illustrates example components of the computing device 100 which pertain to management of application event data. An "application event" is an event, such as an action, activity, or communication, which is generated or performed by, or otherwise associated with, an application on the computing device 100. For example, an application event may comprise a message received at or sent from the computing device 100. The computing device 100 may be provisioned with single or multiple messaging accounts employing one or more different messaging formats or types, which can include email, SMS, IM, multimedia messaging service (MMS), visual voicemail (VVM), PIN-based messages, social network messages or notifications, and calendar and task events. Another example of an application event is a notification that is generated by a particular application executing on the computing device 100. An application may generate various different types of notifications, such as push notifications, reminders, and in-app messages. Additionally, the computing device 100 may also be configured to generate notifications to users about various status changes or events detected by the operating system 122. Examples of such notifications include phone call notifications (e.g. incoming call, missed/ignored call), software update availability, usage statistics (e.g. mobile data usage level, battery level), and device status notifications (e.g. location-based alerts, storage capacity). As used herein, "application event" is not necessarily restricted to the fact of an occurrence, but may also be used interchangeably with "application event data", "item", or "object", to reflect the data received or otherwise obtained by the computing device comprising content and/or metadata pertaining to the event.

In accordance with disclosed embodiments, the computing device 100 may implement a unified inbox. A unified inbox may provide unified user access to a plurality of application event types and/or accounts. The unified inbox collects information about application events associated with various different applications, and presents the information in a content list for viewing or interaction by users of the computing device. The unified inbox may include multiple different types of application events, including messages, notifications, and analogous data objects. An application event may be represented by an application event listing in the unified inbox. In particular, a unified inbox may include a plurality of application event listings corresponding to application events on the computing device 100.

FIG. 2 illustrates data stores 210 of a computing device 100, including stores for different types of messages and notifications serviced on the computing device 100. As shown in FIG. 2, there may be one or more of an email store 211, IM store 212, SMS store 213, MMS store 214, and other stores 215. Each data store 210 may be associated with a dedicated messaging or notification application or function executing on the computing device 100, and/or with a particular message format. As a computing device 100 may be provisioned with multiple user accounts for similar message formats, each provisioned account may be allocated its own distinct data store. In some embodiments, the data stores 210 maintained at the computing device 100 may represent only a portion of the complete message data associated with a given format or account. Complete data stores may be maintained at remote locations; for example, messaging data stores may be maintained at one or more remote message server systems.

Typically, each data store 210 is under the control of and is accessible by a corresponding dedicated application 220. FIG. 2 shows, for each of the data stores 210, a corresponding application 220. Thus, there are illustrated one or more email applications 221, IM applications 222, SMS applications 223, MMS applications 224, and other applications 225. A new application event may be generated by an associated application executing on the computing device 100. For example, a new message may be composed using a messaging application and stored in the corresponding data store 210. An application event may also be obtained from a remote source. One example of such an application event is an SMS message addressed to a user of the computing device 100 that is received at the computing device 100. Another example is an email message that is received by the computing device 100 through synchronization of a data store 210 with a mail server (or other remote data source).

The data stores 210 comprise a set of application event data sources that can be directly accessed by their respective custodian application 220, and processed in various ways for customized presentation by the application 220. As illustrated in FIG. 2, the computing device 100 also includes a unified event manager 260. The unified event manager 260 provides a unified presentation of a plurality of application events on the computing device 100. When a new application event is generated or a previously stored application event is changed, the application 220 that is associated with the application event notifies the unified event manager 260. In particular, the application 220 transmits application event data to the unified event manager 260. The application event data may include, for example, an application identifier (ID), an application event ID or handle, a description (e.g. type, user account, status, etc.) of the application event, and select content of the application event.

As shown in the example of FIG. 2, a merged index 230 of application events may be defined and stored on the computing device 100. The merged index 230 may comprise a master index of application events, which obtains information about changes to the data stores 210 from various applications 220. The merged index 230 provides information about indexed application events to the unified event manager 260. In at least some embodiments, the unified event manager 260 may use the merged index data to construct unified inbox views for display. In particular, the unified event manager 260 may be responsible for generating and maintaining a unified inbox. The merged index 230 may be part of the unified event manager 260, or an independently running process that serves other applications on the computing device 100. Examples of unified inbox operation, use of merged indexes, and other functions that operate in conjunction with a unified inbox are described, at least, in U.S. Pat. No. 7,568,011 issued Jul. 28, 2009, U.S. Pat. No. 8,375,400 issued Feb. 12, 2013, and U.S. Patent Application No. 2013/0297604 published Nov. 7, 2013, all of which are incorporated herein by reference.

During execution, the unified event manager 260 or another application 220 may require services from or user interaction with another application executing on the computing device 100. For instance, when a user wishes to view a given message in a unified inbox view displayed by the unified event manager 260, the actual display of the message may be managed by the custodian application 220 that owns the data store in which the message is stored, or that is associated with the message type of interest. In response to a user command to display the message content, the unified event manager 260 may request the messaging application to launch a particular view displaying the message content. An invocation manager 250 may broker such requests, receiving invocation requests from requesting applications or processes and sending the requests for service to a designated target. In FIG. 2, the invocation manager 250 is shown to be in communication with the unified event manager 260 and other applications 220.

Figure 3:
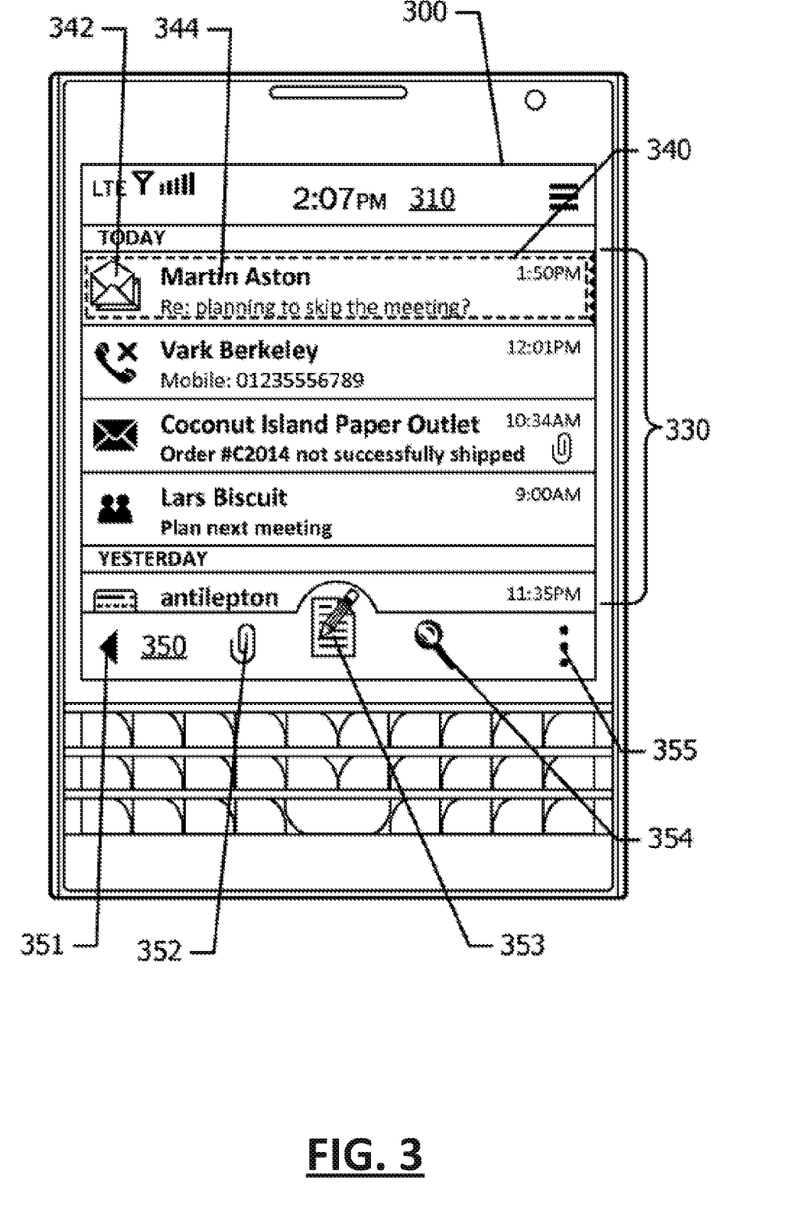
FIG. 3 is an illustration of a unified event listing view displayable by the computing device of FIG. 1.

FIG. 3 illustrates an example of a unified application event view 300, which shows a list of a plurality of application event listings 330 as may be generated by the unified event manager 260. The application event listings 330 are arranged in a list format. FIG. 3 shows example application event listings which are illustrated primarily in relation to messages (email, SMS, or IM); however, these examples can be extended to other types and formats of application events. Each application event listing 330 contains some information about the application event, such as a sender name, subject line (if applicable), preview or excerpt of a message, a timestamp (date and/or time of receipt), and other indicators or flags identifying particular attributes of the message.

In the unified application event view 300, each application event is represented by a user interface element 340 (indicated by dashed lines). The user interface element 340, when actuated, enables the user to access an operation on the application event or further information about the application event. For example, to view the message content associated with a message represented by the user interface element 340, the user may select the user interface element 340 to invoke a view message operation for the message. The selection of the user interface element 340 provides a signal or instruction to an associated application or OS that a particular action represented by the user interface element 340 is to be carried out.

The user interface element 340 may include graphic and textual elements. In the example of FIG. 3, the user interface element 340 includes an icon 342 that indicates a particular status or attribute of the application event, as well as the application event's type, and summary content and/or metadata 344 such as the sender, subject line, and time stamp.

The unified event manager 260, or an analogous implementation on the computing device, may serve multiple functions including, but not limited to, receiving and processing application events information, conversation or event thread management, updating data stores associated with applications, generating and maintaining graphical display information associated with application events, processing user input or commands associated with application event listings, and invoking relevant applications or operations for selected application event listings. Due to the nature of its functions, the unified event manager 260 accesses application data, such as file content and user data, associated with a plurality of different applications. In particular, a unified inbox may contain application data of different types and/or user accounts. The unified inbox may thus represent a potential security vulnerability, as protected file content or private user data may be exposed to users that access the unified inbox. Accordingly, it is desirable to provide security mechanisms for regulating access to application event data of the unified inbox.

Figure 4:
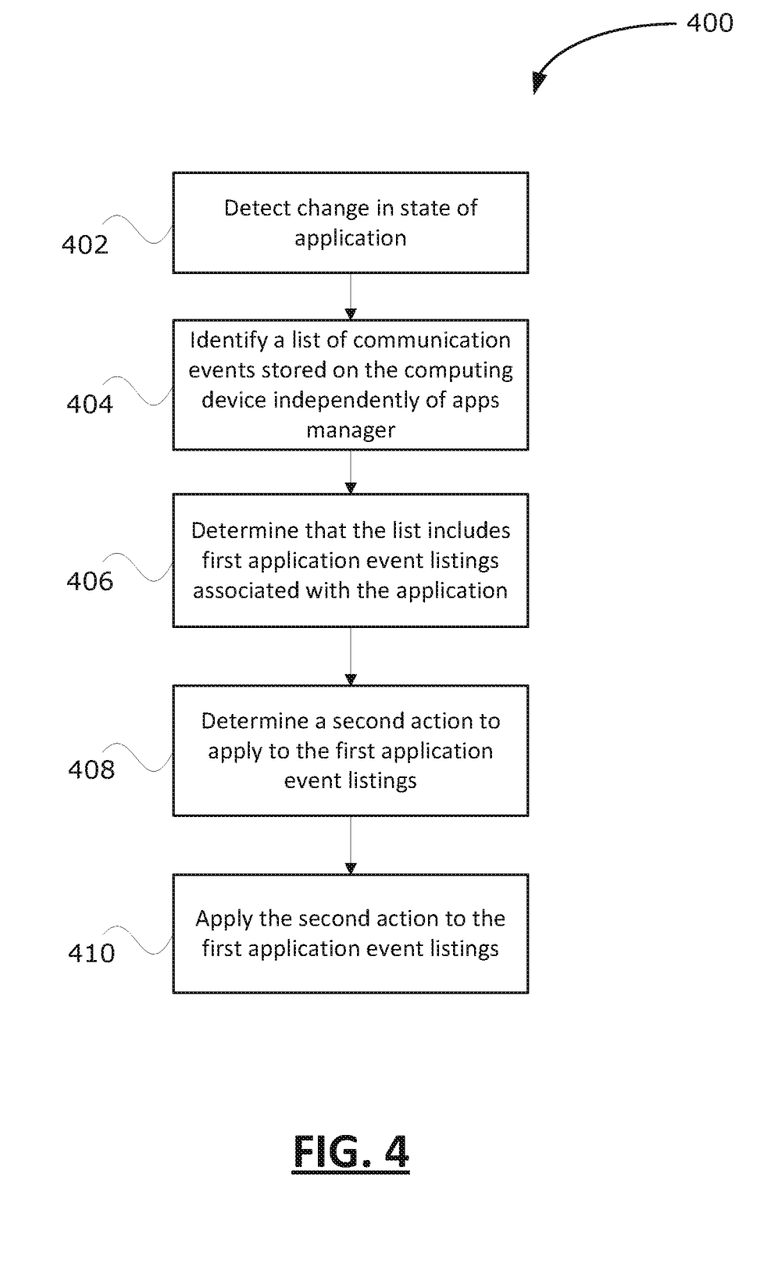
FIG. 4 shows, in flowchart form, a method for managing access to application data on a computing device, in accordance with an example embodiment.

One such mechanism described herein enables selective user access to application event information. A unified event manager operates in conjunction with an applications manager, such as the file vault 190 of FIG. 1, to restrict access to application data, such as protected file content and private user data, associated with one or more managed applications. An example method 400 for managing access to application data is illustrated in FIG. 4. The method 400 is implemented by a computing device, such as the computing device 100 of FIG. 1. In particular, all or part of the method 400 may be performed by a unified event manager, which supports a unified inbox as described above, residing on the computing device.

In operation 402, the computing device detects a change in state of an application that is managed by an applications manager. The change in state is based, at least in part, on a first action within the applications manager. The first action may, for example, be a user input to lock the application. The user input may effect a change in state of the application from an unlocked state to a locked state. An application is locked, or placed in a locked state, if all or parts of the application become inaccessible to unauthorized users. For example, an application may be locked by configuring the application's access settings such that user authentication is required to gain access to the application. In the context of a vault implementation, the first action may be an action from within the vault on a specific application that is managed by or resident in (e.g. stored in blocks of memory associated with) the vault. The vault may, for example, allow users to lock an application on the computing device using the vault.

In some embodiments, the first action may be a user selection of a file to open within the applications manager. The file may, for example, be a protected data file. The computing device may select, or receive a user selection of, an application to open the selected file. If the selected application is an unsecured application, the computing device may automatically adjust a state or setting of the application. For example, the computing device may switch the application to a locked state. That is, if an application is unsecured and is used to open a protected file that is stored in a file or applications manager, the application may be caused to be locked. Examples of file and applications manager operations are described in U.S. patent application Ser. No. 16/360,165, which is incorporated herein by reference.

Additionally or alternatively, an indication of the change in state of the application may be received from the applications manager, in operation 402. In particular, a unified event manager may receive an indication, from the applications manager, that a change in state (or action, activity, etc.) has occurred with respect to an application that is managed by the applications manager.

In response to detecting the change in state of the application, the computing device identifies at least one list of a plurality of application event listings, in operation 404. The application event listings correspond to a plurality of applicant events associated with various applications on the computing device. Specifically, the computing device identifies one or more unified inbox implementations which contain application event data associated with a plurality of application events. The unified inbox is stored on the computing device independently of the applications manager. For example, in the context of a vault implementation, the unified inbox and associated data may be stored in memory independently of the vault (e.g. "outside" of the vault). The unified inbox may, for example, be administered by a second application that is not managed by the applications manager. Thus, in operation 404, the computing device identifies at least one list, or an application administering such at least one list, and associated data that is stored independently of the vault and that will be modified as a result of a first action from within vault.

In operation 406, the computing device determines whether the at least one list includes one or more first application event listings associated with the application. For example, the computing device (or the unified event manager) may determine whether the at least one list contains data from one or more data stores associated with the application. The computing device may query the one or more data stores to identify application events that are represented in the at least one list, or request the application to identify such application events. In some embodiments, the computing device may access application ID information for each of the application event listings included in the at least one list. For example, a unified event manager or an associated merged index may maintain application ID data for the application event listings. In operation 406, the computing device may identify those application event listings that have an application ID matching that of the application.

If the at least one list includes one or more first application event listings, the computing device determines a second action to apply to the first application event listings, in operation 408, and in operation 410, applies the second action to the first application event listings. In some embodiments, the second action may comprise deleting the first application event listings from the at least one list. For example, the first application event listings may be removed from a merged index associated with the unified event manager for the at least one list. In this way, a unified inbox that is constructed by the unified event manager based on the merged index of application event listings will not contain the "deleted" first application event listings. In some embodiments, the second action may comprise flagging the first application event listings using one or more suitable flags/indicators. For example, the first application event listings in the at least one list may be flagged as "hidden", "locked", "unlocked", or any other status representing the modifications to the first application event listings which result from the change in state of the application.

Figure 5:
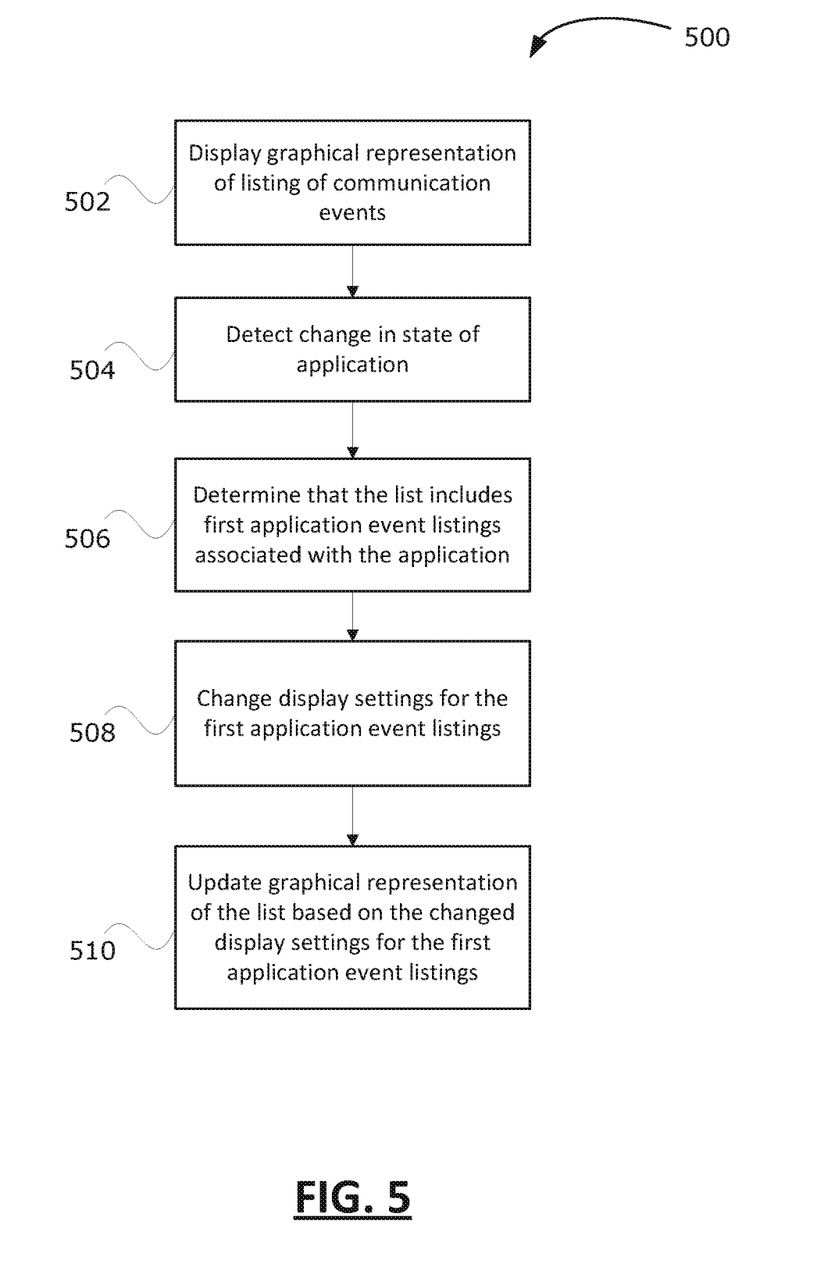
FIG. 5 shows, in flowchart form, a method for managing display of application data on a computing device, in accordance with an example embodiment.

In at least some embodiments, the second action may relate to updating a graphical representation of the at least one list of application event listings. FIG. 5 shows, in flowchart form, an example method 500 for managing display of application data on a computing device. The method 500 is implemented by a computing device, such as the computing device 100 of FIG. 1. In particular, all or part of the method 500 may be performed by a unified event manager, which supports a unified inbox as described above, residing on the computing device.

In operation 502, the computing device displays, on a display interface, a graphical representation of a list of application event listings. As illustrated in the example of FIG. 3, the graphical representation may include user interface elements corresponding to a plurality of application event listings of the list.

In operation 504, the computing device detects a change in state of a managed application, and, in response, determines whether the list of application event listings includes one or more first application event listings associated with the managed application, in operation 506. If the list does include such first application event listings, the computing device changes display settings for the first application event listings, in operation 508. The change in display settings depends on the particular state change of the managed application. The graphical representation of the list is then updated based on the changed display settings for the first application event listings.

For example, if the state change comprises a switch of the application from an unlocked state to a locked state, the user interface elements corresponding to the first application event listings may be removed from the graphical representation of the list. That is, the select user interface elements may be hidden from a view of the list such that they are inaccessible to users of the list (i.e. unified inbox).

As another example, if the state change of the application comprises a switch from a locked state to an unlocked state, the graphical representation of the list may be updated to change visibility of the user interface elements corresponding to the first application event listings. In particular, the select user interface elements may be changed from a hidden status to being visible in a view of the list. The user interface elements then become accessible (e.g. selectable) in the modified graphical representation of the list.

In some embodiments, a unified event manager may update a merged index of application event listings based on a detected change in state of an application. In particular, a merged index may be updated to add or delete one or more application event listings. For example, if an application is determined to be changed to a locked state, application event listings that are associated with the application may be deleted from the merged index. On the other hand, if an application is determined to be changed to an unlocked state, the merged index may be updated to add application event listings that are retrieved, for example, from one or more data stores that are corresponding to the application. Thus, the unified event manager may be configured to alter an index of application event listings for a list that contains application event data, and not just a graphical representation of such list.

Figure 6:
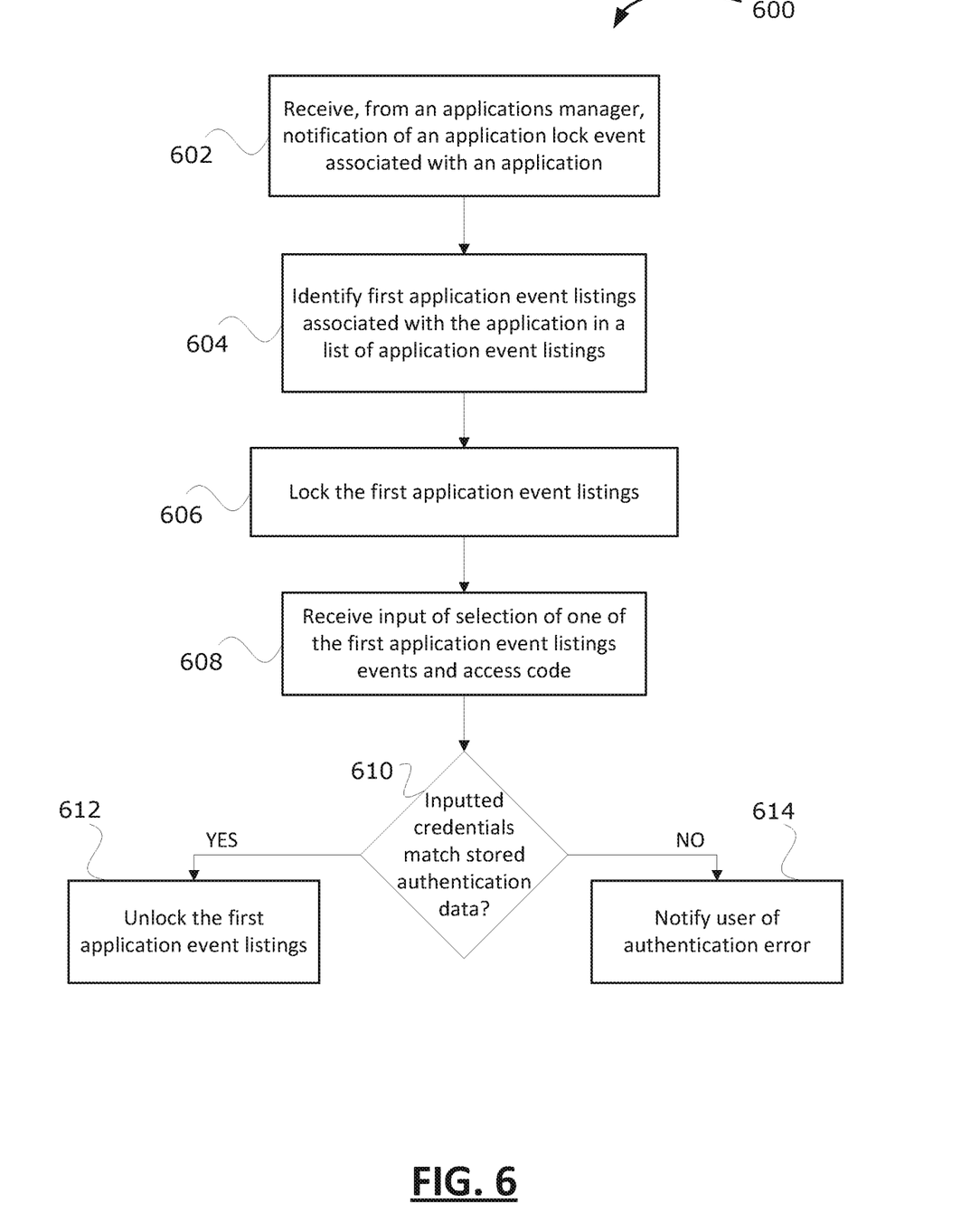
FIG. 6 shows, in flowchart form, a method for managing access to application data on a computing device, in accordance with another example embodiment.

Reference is now made to FIG. 6, which shows, in flowchart form, another example method 600 for managing access to application data on a computing device. The method 600 is implemented by a computing device, such as the computing device 100 of FIG. 1. In particular, all or part of the method 600 may be performed by a unified event manager, which supports a unified inbox as described above, residing on the computing device.

In operation 602, a unified event manager receives, from an applications manager, an indication of an application lock event associated with an application. The unified event manager, which manages operations of a list containing a plurality of application event listings, identifies one or more first application event listings that are associated with the locked application, in operation 604. If the list includes such first application event listings, in operation 606, the unified event manager may lock the first application event listings. By "locking" an application event listing, the unified event manager requires user authentication for accessing content of the application event listing. The unified event manager may, for example, flag those application event listings that are to be locked, such that user interaction with any flagged application event listing requires successful user authentication prior to user access. In some embodiments, the locked application event listings may be hidden from view in a graphical representation of the list unless otherwise requested by a user. For example, users that are authorized to access one or more applications that are in a locked state may request that the locked application event listings be visible and accessible for authentication.

Thus, a user authentication scheme for locked application event listings may be implemented to control access to application data associated with applications that are locked. In operation 608, the unified event manager receives selection of one of the first application event listings from the list as well as user input of authentication data. The unified event manager then verifies that a user associated with the inputted authentication data is permitted to access application event listings associated with the application. For example, in operation 610, the unified event manager checks whether the inputted user credentials match stored authentication data for the locked application. The authentication data for gaining access to locked applications may, for example, be maintained by the unified event manager or an applications manager, such as file vault 190.

If the inputted user credentials match the stored authentication data, the first application event listings may be unlocked, allowing user interaction (such as selection, actuation, or invocation of the associated application) with the first application event listings. Authentication may be required at each instance of interaction with one of the first application event listings, or only on the first interaction. In particular, once a user has been authenticated for accessing locked application event listings, the user may be granted access until a user session for the user is ended (e.g. user logs out, or device restarts). If, on the other hand, the inputted credentials do not match the stored authentication data for the locked application, the unified event manager may notify the user of an authentication error. For example, the user may be presented with an error message and a prompt to re-enter user credentials.

In some embodiments, a user that is authorized to access a plurality of locked applications may gain access to all of the locked applications by entering their user credentials one time to authenticate themselves to the unified event manager. That is, rather than requiring a user to enter the same credentials for interacting with application event listings of each locked application, the user may be authenticated once in order to access all application event listings associated with those applications for which they have been authorized. A successful user authentication to the unified event manager for accessing locked application event listings may, for example, cause those application event listings to become visible to the user. In particular, a graphical representation of the list of application event listings may be updated based on a successful user authentication to show those application event listings that the user is permitted to interact with.

Example embodiments of the present application are not limited to any particular operating system, system architecture, computing device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A method of managing access to application data on a computing device, the method comprising:
    detecting a change in state of an application that is managed using an applications manager from an unlocked state to a locked state, the change in state being based on a first action within the applications manager;
    in response to detecting the change in state of the application:
        identifying at least one list of a plurality of application event listings stored on the computing device independently of the applications manager, the plurality of application event listings corresponding to a plurality of application events;
        displaying, on a display, a graphical representation of the at least one list, the graphical representation including user interface elements corresponding to the plurality of application event listings of the at least one list;
        determining that the at least one list includes one or more first application event listings associated with the application; and
        in response to determining that the at least one list includes the one or more first application event listings:
            determining a second action to apply to only the one or more first application event listings, the second action for changing accessibility of the one or more first application event listings, wherein the second action includes removing, from the graphical representation of the at least one list, user interface elements corresponding to the one or more first application event listings; and
            applying the second action to only the one or more first application event listings.

2. The method of claim 1, wherein the second action comprises locking the one or more first application event listings, and wherein the locking comprises requiring user authentication for accessing content of the one or more first application event listings.

3. The method of claim 2, further comprising:
    receiving selection of one of the first application event listings from the at least one list and input of user authentication data;
    verifying that a user associated with the inputted user authentication data is permitted to access application data associated with the application; and
    in response to verifying that the user associated with the inputted user authentication data is permitted to access the application data, granting, to the user, access to the selected first application event listing.

4. The method of claim 1, wherein the change in state comprises a switch of the application from a locked state to an unlocked state.

5. The method of claim 4, wherein the second action comprises unlocking the one or more first application event listings, and wherein the unlocking comprises removing restrictions on accessing content of the one or more first application event listings.

6. The method of claim 4, further comprising displaying, on a display, a graphical representation of the at least one list, the graphical representation including user interface elements corresponding to the plurality of application event listings of the at least one list, wherein the second action comprises changing visibility of user interface elements corresponding to the one or more first application event listings.

7. The method of claim 1, wherein detecting the change in state of the application comprises receiving, from the applications manager, an indication of the change in state.

8. The method of claim 1, wherein the at least one list is maintained by a second application that is not managed using the applications manager.

9. A computing device, comprising:
an input interface;
memory;
a processor coupled with the input interface and the memory, the processor being configured to:
detect a change in state of an application that is managed using an applications manager from an unlocked state to a locked state, the change in state being based on a first action within the applications manager;
in response to detecting the change in state of the application:
identify at least one list of a plurality of application event listings stored on the computing device independently of the applications manager, the plurality of application event listings corresponding to a plurality of application events;
display, on a display, a graphical representation of the at least one list, the graphical representation including user interface elements corresponding to the plurality of application event listings of the at least one list;
determine that the at least one list includes one or more first application event listings associated with the application; and
in response to determining that the at least one list includes the one or more first application event listings:
determine a second action to apply to only the one or more first application event listings, the second action for changing accessibility of the one or more first application event listings, wherein the second action includes removing, from the graphical representation of the at least one list, user interface elements corresponding to the one or more first application event listings; and
apply the second action to only the one or more first application event listings.

10. The computing device of claim 9, wherein the second action comprises locking the one or more first application event listings, and wherein the locking comprises requiring user authentication for accessing content of the one or more first application event listings.

11. The computing device of claim 10, wherein the processor is further configured to:
receive selection of one of the first application event listings from the at least one listing and input of user authentication data;
verify that a user associated with the inputted user authentication data is permitted to access application data associated with the application; and
in response to verifying that the user associated with the inputted user authentication data is permitted to access the application data, grant, to the user, access to the selected first application event listing.

12. The computing device of claim 9, wherein the change in state comprises a switch of the application from a locked state to an unlocked state.

13. The computing device of claim 12, wherein the second action comprises unlocking the one or more first application event listings, and wherein the unlocking comprises removing restrictions on accessing content of the one or more first application event listings.

14. The computing device of claim 12, further comprising displaying, on a display, a graphical representation of the at least one list, the graphical representation including user interface elements corresponding to the plurality of application event listings of the at least one list, wherein the second action comprises changing visibility of user interface elements corresponding to the one or more first application event listings.

15. The computing device of claim 9, wherein detecting the change in state of the application comprises receiving, from the applications manager, an indication of the change in state.

16. The computing device of claim 9, wherein the at least one list is maintained by a second application that is not managed using the applications manager.

* * * * *